(12) United States Patent
Quan

(10) Patent No.: US 10,975,743 B1
(45) Date of Patent: Apr. 13, 2021

(54) VEHICLE EXHAUST COMPONENT

(71) Applicant: Tenneco Automotive Operating Company Inc., Lake Forest, IL (US)

(72) Inventor: Guangchun Quan, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/818,069

(22) Filed: Mar. 13, 2020

(51) Int. Cl.
| | | |
|---|---|---|
| F01N 1/02 | (2006.01) | |
| B01D 53/94 | (2006.01) | |
| F01N 3/28 | (2006.01) | |
| B01D 46/42 | (2006.01) | |
| C23C 24/04 | (2006.01) | |

(52) U.S. Cl.
CPC ........... *F01N 1/02* (2013.01); *B01D 46/4236* (2013.01); *B01D 53/944* (2013.01); *B01D 53/9431* (2013.01); *F01N 3/2803* (2013.01); *B01D 2279/30* (2013.01); *C23C 24/04* (2013.01); *F01N 2530/02* (2013.01)

(58) Field of Classification Search
CPC .... F16L 58/00; F16L 58/1072; F16L 58/1027
USPC .......................... 181/244, 245, 146; 422/168
See application file for complete search history.

(56) References Cited

U.S. PATENT DOCUMENTS

| | | | |
|---|---|---|---|
| 1,280,386 A | | 10/1918 | Buehner |
| 1,512,961 A | * | 10/1924 | Weil ...................... F01N 13/102 138/145 |
| 2,323,955 A | | 7/1943 | Wilson |
| 2,692,025 A | | 10/1954 | Hamilton |
| 2,940,249 A | | 6/1960 | Gospodar |
| 2,975,072 A | * | 3/1961 | Bryant ...................... C23D 3/00 138/146 |
| 3,109,510 A | * | 11/1963 | Phelan .................... F01N 13/16 181/244 |
| 3,209,858 A | | 10/1965 | Jettinghoff |

(Continued)

FOREIGN PATENT DOCUMENTS

| | | |
|---|---|---|
| CN | 102230407 A | 11/2011 |
| CN | 103603707 A | 2/2014 |

(Continued)

OTHER PUBLICATIONS

International Search Report and Written Opinion regarding PCT/US2018/064897, dated Mar. 21, 2019, 10 pages.

(Continued)

*Primary Examiner* — Tom P Duong
(74) *Attorney, Agent, or Firm* — Harness, Dickey & Pierce, P.L.C.

(57) ABSTRACT

An exhaust component for a motor vehicle includes a wall, an internal volume, an inlet, and an outlet. The wall includes a core layer having a surface and a first layer disposed on a portion of the surface. The portion is less than 100 percent of an area of the surface. The core layer has a first composition. The first layer is a cold-sprayed layer. The core layer has a second composition different from the first composition. The first layer reduces surface-radiated noise from the exhaust component during operation of the motor vehicle. The internal volume is at least partially defined by the wall. The inlet is in fluid communication with the internal volume. The outlet is in fluid communication with the internal volume.

13 Claims, 6 Drawing Sheets

(56) References Cited

U.S. PATENT DOCUMENTS

| | | | |
|---|---|---|---|
| 3,209,860 A | 10/1965 | Lentz | |
| 3,209,862 A * | 10/1965 | Young | F01N 13/1838 181/245 |
| 3,337,939 A * | 8/1967 | Parkinson | F01N 13/16 29/890.08 |
| 3,388,769 A | 6/1968 | Martoia | |
| 3,420,052 A | 1/1969 | Miller | |
| 3,583,524 A | 6/1971 | Dubois | |
| 3,623,901 A | 11/1971 | Forstmann et al. | |
| 3,643,760 A | 2/1972 | Hubbell, III | |
| 3,709,320 A | 1/1973 | Hollerl et al. | |
| 3,768,987 A | 10/1973 | Forstmann et al. | |
| 3,794,139 A | 2/1974 | Hetherington et al. | |
| 3,827,529 A | 8/1974 | Frietzsche et al. | |
| 3,949,829 A | 4/1976 | Honda et al. | |
| 4,064,963 A * | 12/1977 | Kaan | F01N 13/14 181/244 |
| 4,359,865 A | 11/1982 | Nakao et al. | |
| 4,756,437 A | 7/1988 | Rossi-Mossuti | |
| 4,909,348 A | 3/1990 | Harwood et al. | |
| 5,052,513 A | 10/1991 | Yoshikawa et al. | |
| 5,265,420 A | 11/1993 | Rutschmann | |
| 5,321,214 A | 6/1994 | Uegane et al. | |
| 5,403,557 A * | 4/1995 | Harris | B04C 3/06 422/169 |
| 5,530,213 A * | 6/1996 | Hartsock | F01N 13/10 181/240 |
| 5,593,645 A | 1/1997 | Steenackers et al. | |
| 5,907,135 A * | 5/1999 | Hayakawa | F01N 1/02 181/282 |
| 6,341,664 B1 * | 1/2002 | Gerber | F01N 1/003 181/272 |
| 6,598,581 B2 * | 7/2003 | Kempf | F02B 77/13 123/184.61 |
| 6,726,957 B2 * | 4/2004 | Niemiec | B05D 1/02 427/327 |
| 6,830,847 B2 | 12/2004 | Ramaswami et al. | |
| 6,889,499 B2 | 5/2005 | Bassani | |
| 7,001,675 B2 | 2/2006 | Chan | |
| 7,051,523 B2 | 5/2006 | Kerchner | |
| 7,506,723 B2 | 3/2009 | Hoerr et al. | |
| 7,637,349 B2 | 12/2009 | Harada | |
| 7,669,693 B2 | 3/2010 | Yamaguchi et al. | |
| 7,789,195 B2 | 9/2010 | Mabuchi et al. | |
| 7,874,401 B2 | 1/2011 | Uhlemann et al. | |
| 7,967,107 B2 | 6/2011 | Han et al. | |
| 8,292,026 B2 | 10/2012 | Tauschek et al. | |
| 8,402,756 B2 | 3/2013 | Luce et al. | |
| 8,557,397 B2 | 10/2013 | Bullard et al. | |
| 8,628,861 B2 | 1/2014 | Bullard et al. | |
| 8,684,131 B1 | 4/2014 | Park et al. | |
| 8,827,035 B2 | 9/2014 | Ross et al. | |
| 9,067,282 B2 | 6/2015 | Sharp | |
| 9,095,932 B2 | 8/2015 | Miller et al. | |
| 9,096,035 B2 | 8/2015 | Sachdev et al. | |
| 9,109,482 B2 | 8/2015 | Fritz et al. | |
| 9,121,320 B2 | 9/2015 | Carr et al. | |
| 9,341,102 B2 | 5/2016 | Ross et al. | |
| 9,393,759 B2 | 7/2016 | Luo et al. | |
| 9,429,052 B2 | 8/2016 | Horr | |
| 9,623,515 B2 | 4/2017 | Breuer et al. | |
| 9,689,301 B2 | 6/2017 | Carr et al. | |
| 9,862,058 B2 | 1/2018 | Breuer et al. | |
| 2005/0115764 A1 | 6/2005 | Mabuchi et al. | |
| 2006/0162995 A1 | 7/2006 | Schorn et al. | |
| 2006/0231330 A1 | 10/2006 | Morales et al. | |
| 2007/0102236 A1 | 5/2007 | Uhlemann et al. | |
| 2007/0227807 A1 | 10/2007 | Meneely et al. | |
| 2008/0093161 A1 | 4/2008 | Winkel et al. | |
| 2008/0093162 A1 | 4/2008 | Marocco et al. | |
| 2008/0196969 A1 | 8/2008 | Henke et al. | |
| 2009/0000862 A1 | 1/2009 | Buell et al. | |
| 2009/0229913 A1 | 9/2009 | Tonietto et al. | |
| 2009/0249603 A1 | 10/2009 | Vargas | |
| 2011/0083924 A1 | 4/2011 | Park | |
| 2013/0213734 A1 | 8/2013 | Ahn et al. | |
| 2014/0027414 A1 | 1/2014 | Lin et al. | |
| 2014/0144721 A1 | 5/2014 | Park | |
| 2014/0151149 A1 | 6/2014 | Ross et al. | |
| 2015/0008068 A1 | 1/2015 | Hamashima et al. | |
| 2016/0340786 A1 | 11/2016 | Mukai et al. | |
| 2017/0080523 A1 | 3/2017 | Andersson et al. | |

FOREIGN PATENT DOCUMENTS

| | | |
|---|---|---|
| CN | 204163804 U | 2/2015 |
| CN | 103014694 B | 4/2015 |
| CN | 204851384 U | 12/2015 |
| CN | 205840974 U | 12/2016 |
| CN | 106285879 A | 1/2017 |
| DE | 2706957 A1 | 8/1978 |
| DE | 2856889 A1 | 11/1980 |
| DE | 102004039006 A1 | 2/2006 |
| DE | 102013106651 A1 | 1/2015 |
| EP | 0047678 A1 | 3/1982 |
| EP | 0328056 A2 | 8/1989 |
| EP | 0523008 B1 | 9/1996 |
| EP | 0808877 B1 | 9/2003 |
| EP | 1918544 A1 | 5/2008 |
| EP | 3112654 A1 | 1/2017 |
| GB | 1393232 A | 5/1975 |
| JP | S6338524 B2 | 8/1988 |
| JP | S63285213 A | 11/1988 |
| JP | 10296090 A | 11/1998 |
| JP | H11140665 A | 5/1999 |
| JP | 2000337126 A | 12/2000 |
| JP | 2006144707 A | 6/2006 |
| JP | 3853903 B2 | 12/2006 |
| JP | 2007308737 A | 11/2007 |
| JP | 2009072695 A | 4/2009 |
| JP | 2009215941 A | 9/2009 |
| JP | 2010255520 A | 11/2010 |
| JP | 2011027038 A | 2/2011 |
| JP | 2011085113 A | 4/2011 |
| JP | 4691707 B2 | 6/2011 |
| JP | 5335595 B2 | 11/2013 |
| JP | 2013238160 A | 11/2013 |
| JP | 5529839 B2 | 6/2014 |
| JP | 2015063985 A | 4/2015 |
| JP | 5992768 B2 | 9/2016 |
| JP | 6443138 B2 | 12/2018 |
| KR | 100797823 B1 | 1/2008 |
| KR | 20090071167 A | 7/2009 |
| KR | 101262612 B1 | 5/2013 |
| WO | WO-2016206915 A1 | 12/2016 |
| WO | WO-201750711 A1 | 3/2017 |

OTHER PUBLICATIONS

U.S. Appl. No. 16/250,419, filed Jan. 17, 2019, Guangchun Quan.

U.S. Appl. No. 16/250,388, filed Jan. 17, 2019, Guangchun Quan et al.

U.S. Appl. No. 16/250,352, filed Jan. 17, 2019, Guangchun Quan.

* cited by examiner

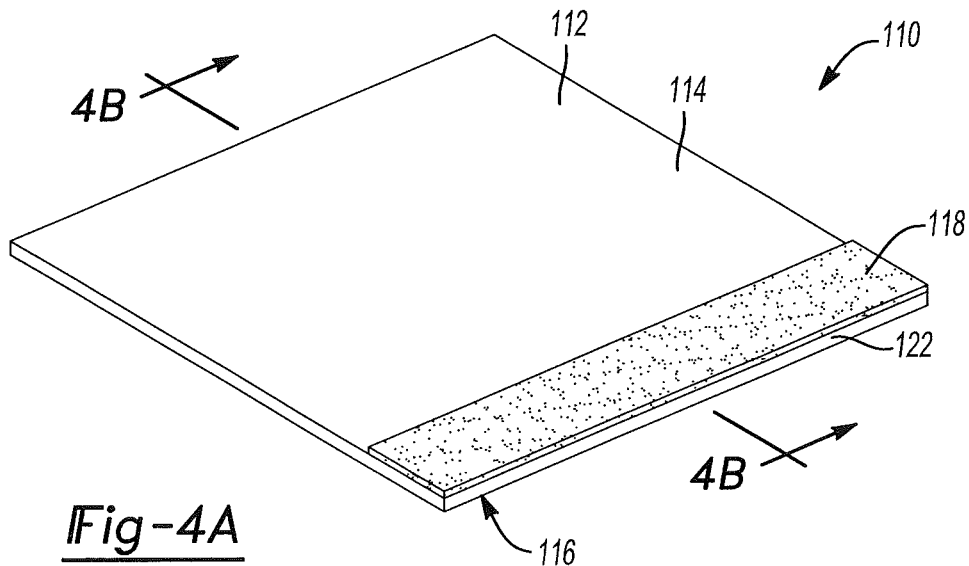
_Fig-4A_
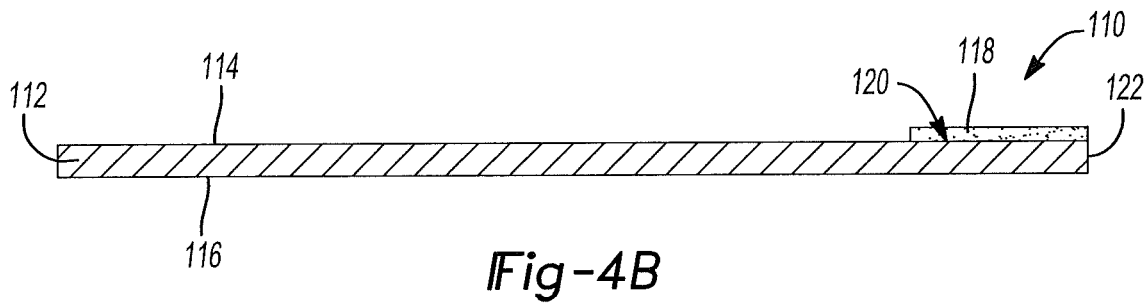
_Fig-4B_
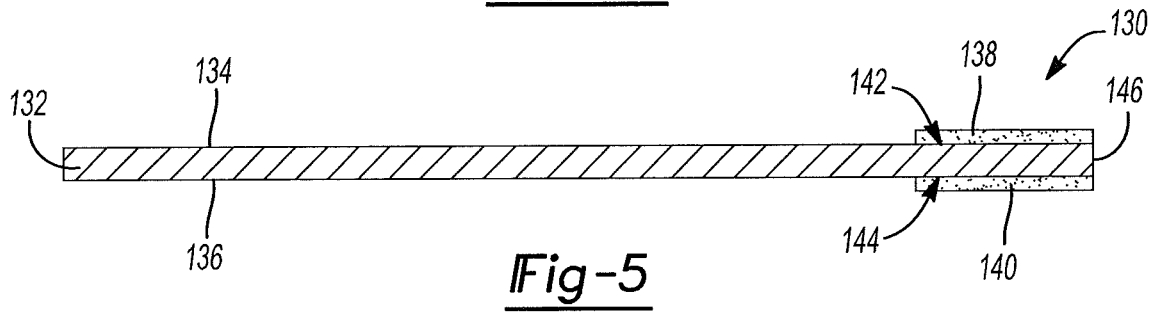
_Fig-5_
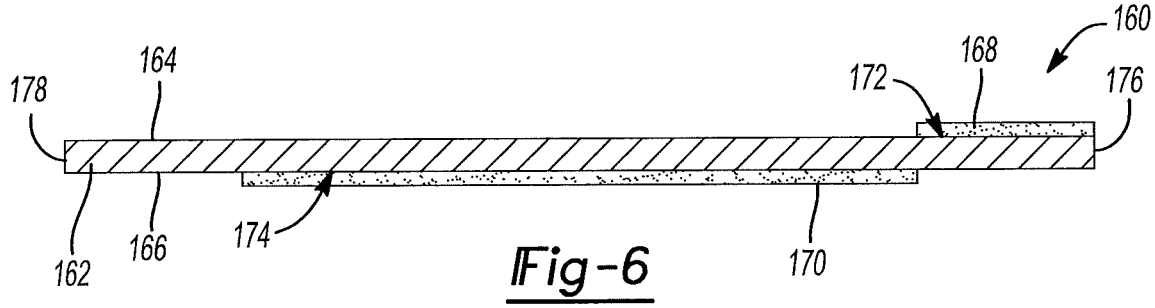
_Fig-6_

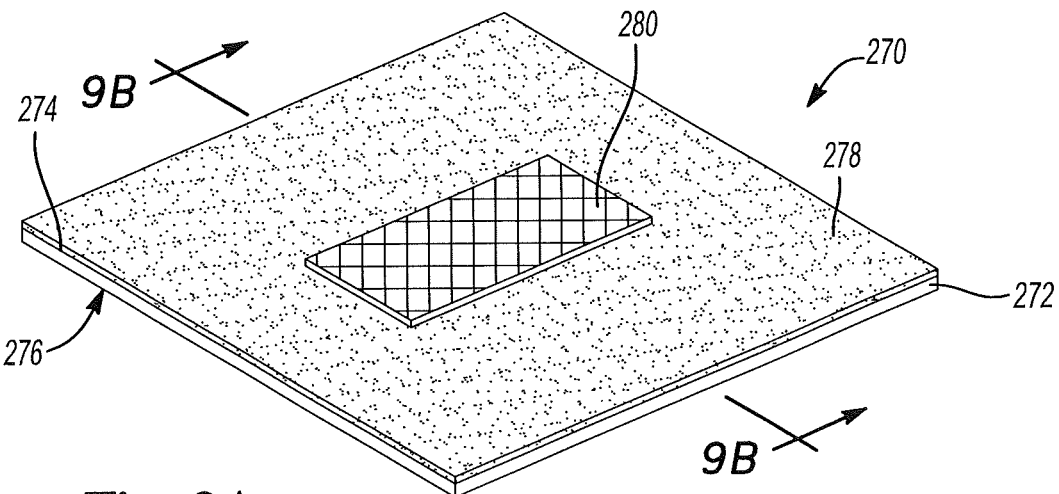
Fig-9A
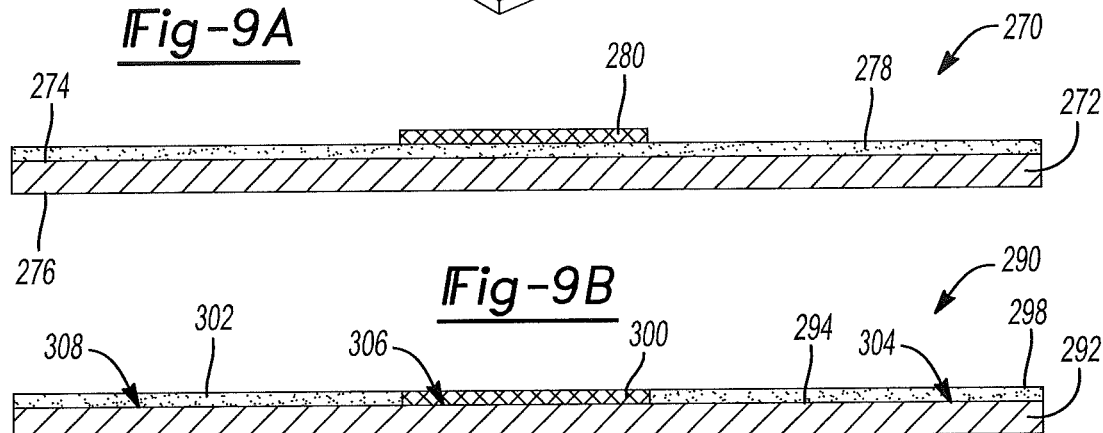
Fig-9B
Fig-10
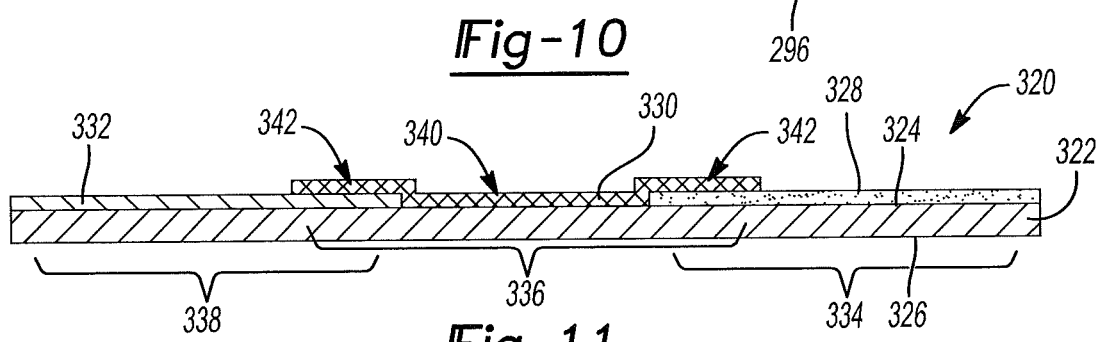
Fig-11
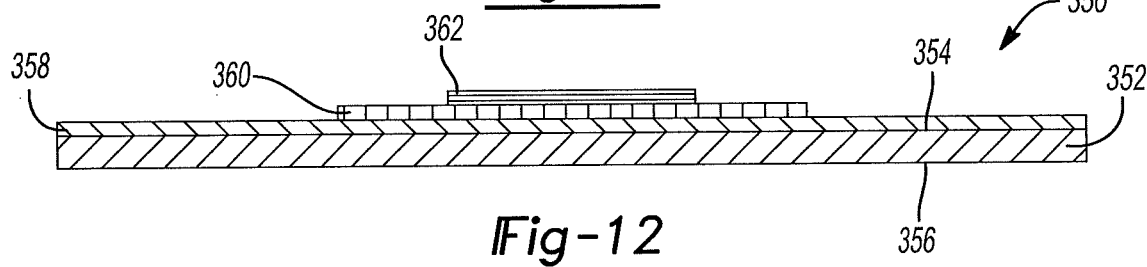
Fig-12

VEHICLE EXHAUST COMPONENT

FIELD

The present disclosure relates generally to exhaust components to motor vehicles and more particularly to exhaust components having reduced surface-radiated noise during use and/or corrosion. The present disclosure also provides methods of manufacturing the exhaust components.

BACKGROUND

This section provides background information related to the present disclosure which is not necessarily prior art.

Motor vehicles typically have an exhaust system that transports hot exhaust gases from an internal combustion engine powering the motor vehicle to the outside environment. Such exhaust systems typically include various exhaust components, including without limitation, headers, down pipes, x-pipes, exhaust pipes, and mufflers. Depending on the type of fuel source used to power the internal combustion engine in the motor vehicle (e.g., gasoline versus diesel), the exhaust system may include additional exhaust components that provide emissions control, including without limitation, catalytic converters, urea injectors, selective catalytic reduction (SCR) units, diesel oxidation catalysts (DOC), and diesel particulate filters (DPF).

Exhaust components may be constructed to be thinner as demand for reduced vehicle mass increases. Such reduced-mass exhaust components may be prone to vibration that leads to surface-radiated noise. Additionally, some exhaust components may suffer from long-term corrosion. Corrosion may occur on external surfaces of the exhaust component, such from exposure to water and road salt, and/or internally, such as from exhaust gases and condensation including water and/or urea.

SUMMARY

This section provides a general summary of the disclosure, and is not a comprehensive disclosure of its full scope or all of its features.

The present disclosure provides an exhaust component for a motor vehicle. The exhaust component includes a wall, an internal volume, an inlet, and an outlet. The wall includes a core layer having a surface and a first layer disposed on a portion of the surface. The portion is less than 100 percent of an area of the surface. The core layer has a first composition. The first layer is a cold-sprayed layer. The core layer has a second composition different from the first composition. The first layer reduces surface-radiated noise from the exhaust component during operation of the motor vehicle. The internal volume is at least partially defined by the wall. The inlet is in fluid communication with the internal volume. The outlet is in fluid communication with the internal volume.

In some configurations, the first layer defines a thickness ranging from 5 μm to 1 mm.

In some configurations, the wall further includes a second layer disposed on the surface.

In some configurations, the second layer has a third composition different from the second composition and the first composition.

In some configurations, the first layer and the second layer are at least partially overlapping.

In some configurations, the first layer and the second layer are coextensive.

In some configurations, the first layer and the second layer are non-overlapping.

In some configurations, the first layer includes iron.

In some configurations, the first layer consists essentially of manganese in an amount ranging from 10 percent to 25 percent, chromium in an amount ranging from 10 percent to 25 percent, titanium in an amount ranging from 0.5 percent to 1 percent, and a balance iron.

In some configurations, the core layer includes stainless steel.

In some configurations, the exhaust component includes one of: a muffler, an exhaust pipe, a catalytic converter, a urea injector, a selective catalytic reduction unit, a diesel oxidation catalyst, or a diesel particulate filter.

In some configurations, the exhaust component includes the muffler.

The present disclosure provides an exhaust component for a motor vehicle. The exhaust component includes a wall, an internal volume, an inlet, and an outlet. The wall includes a core layer having a surface and a corrosion-resistant layer disposed on a portion of the surface. The portion is less than 100 percent of an area of the surface. The core layer includes stainless steel. The corrosion-resistant layer includes aluminum, chromium, manganese, iron, or combinations thereof. The corrosion-resistant layer reduces surface radiated noise from the exhaust component during operation of the motor vehicle. The internal volume is at least partially defined by the wall. The inlet is in fluid communication with the internal volume. The outlet is in fluid communication with the internal volume.

The present disclosure provides a method of improving sound dampening of an exhaust component for a motor vehicle. The method includes identifying a target region of the exhaust component. The target region is expected to exceed a threshold level of surface-radiated noise during operation of the motor vehicle. The exhaust component includes a wall having a surface, an internal volume at least partially defined by the wall, an inlet in fluid communication with the internal volume, and an outlet in fluid communication with the internal volume. The method further includes applying a coating layer to a portion of a surface of the exhaust component corresponding to the target region. The portion is less than 100 percent of an area of the surface.

In some configurations, applying includes cold spraying, diffusion bonding, thermal spraying, or combinations thereof.

In some configurations, applying includes cold spraying.

In some configurations, the method further includes forming the exhaust component.

In some configurations, applying is performed after forming.

In some configurations, applying is performed prior to forming.

In some configurations, the method further includes roughening the surface prior to applying.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4A is a top perspective view of a metal sheet including a core and a layer covering a portion of a surface of the core according to the principles of the present disclosure;

FIG. 4B is a sectional view of the metal sheet of FIG. 3A taken at line 4B-4B of FIG. 4A;

FIG. 5 is a sectional view of another metal sheet according to the principles of the present disclosure, the metal sheet including a core and coextensive layers disposed on opposing surfaces of the core;

FIG. 6 is a sectional view of yet another metal sheet according to the principles of the present disclosure, the metal sheet including a core and non-coextensive layers disposed on opposing surfaces of the core;

FIG. 9A is a top perspective view of a metal sheet according to the principles of the present disclosure, the metal sheet including a core, a first layer covering substantially an entire surface of the core, and a second layer covering a portion of the first layer;

FIG. 9B is a sectional view of the metal sheet of FIG. 8A taken at line 8B-8B of the metal sheet;

FIG. 10 is a sectional view of another metal sheet according to the principles of the present disclosure, the metal sheet including a core and a plurality of layers cooperating to cover a surface of the core;

FIG. 11 is a sectional view of another metal sheet according to the principles of the present disclosure, the metal sheet including a core and a plurality of partially overlapping layers cooperating to cover a surface of the core;

FIG. 12 is a sectional view of another metal sheet according to the principles of the present disclosure, the metal sheet including a core and a plurality of stacked, non-coextensive layers.

Corresponding reference numerals indicate corresponding parts throughout the several views of the drawings.

DETAILED DESCRIPTION

Figure 1:
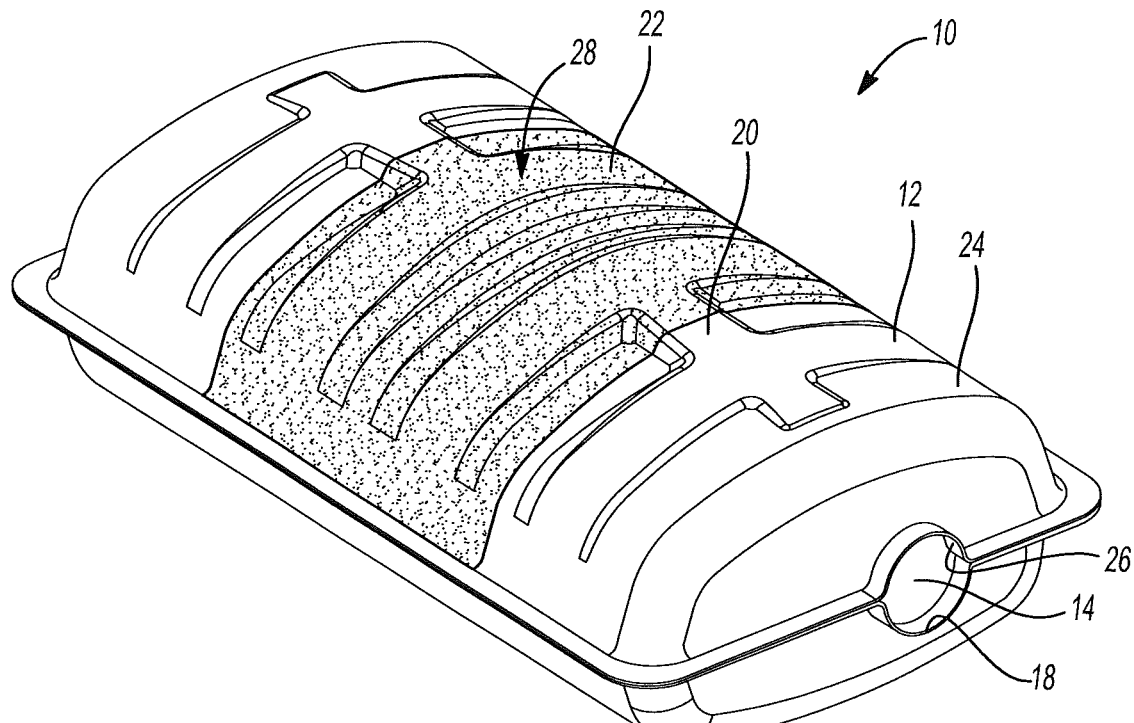
FIG. 1 is a perspective view of an exhaust component according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As described above, exhaust components may be susceptible to surface-radiated noise during operation of the motor vehicle and/or long-term corrosion. Certain regions may be more prone to noise and/or corrosion than other regions due to geometry of the exhaust component and/or chemical, mechanical, and/or microstructural changes during manufacturing processes, such as forming and welding. Surface-radiated noise may be caused by vibration of an exhaust component or portion of the component due to motion of the motor vehicle as it traverses along a surface, vibration from an engine of the vehicle, braking, and the like. In some exhaust components including a wall and an internal volume, the exhaust component may act like a drum to reradiate the noise. The present disclosure provides an exhaust component having a surface for reduction of surface-radiated noise and/or corrosion. In certain aspects, the exhaust component includes a coating that facilitates local noise reduction and/or corrosion.

Referring to FIG. 1, an exhaust component 10 for a motor vehicle according to the principles of the present disclosure is provided. The exhaust component 10 may be a muffler, an exhaust pipe, a catalytic converter, a urea injector, a selective catalytic reduction unit, a diesel oxidation catalyst, or a diesel particulate filter, by way of example. In certain aspects, the exhaust component 10 is a stamped-shell muffler.

The exhaust component 10 includes a wall 12. The wall 12 at least partially defines an internal volume 14. The exhaust component 10 includes an inlet (not shown) and an outlet 18. The inlet and the outlet 18 are fluidly connected to the internal volume 14.

The wall 12 includes a core 20 (also referred to as a "core layer") and a local coating or layer 22. The core 20 may include steel, stainless steel, or combinations thereof, by way of example. Stainless steel may include stainless steel 409, stainless steel 436, stainless steel 439, or a spatially optimized diffusion alloy ("SODA"), such as OPTIFORM®, by ARCANUM ALLOYS, by way of example.

The core 20 includes a first or external surface 24 and a second or internal surface 26 in fluid communication with the internal volume 14. The layer 22 is disposed on at least a portion 28 of the external surface 24. In certain aspects, a layer may additionally or alternatively be disposed on an internal surface. The layer 22 may be adapted to reduce surface-radiated noise from the exhaust component 10 during operation of the motor vehicle compared to a similar exhaust component without the layer 22. The layer 22 may be adapted to reduce or prevent corrosion of the exhaust component 10 compared to a similar exhaust component without the layer 22. In certain aspects, the layer 22 may be adapted to reduce or prevent both surface-radiated noise and corrosion compared to an exhaust component without the layer 22.

The layer 22 may advantageously be localized to one or more areas that have a high likelihood of experiencing surface-radiated noise and/or corrosion. Accordingly, a cost and weight of the exhaust component 10 may be reduced compared to a fully-coated exhaust component. The portion 28 may be less than 100 percent of a surface area of the external surface 24. In certain aspects, the portion 28 may be less than 90 percent of the surface area, optionally less than 80 percent of the surface area, optionally less than 70 percent of the surface area, optionally less than 60 percent of the surface area, optionally less than 50 percent of the surface area, optionally less than 40 percent of the surface area, optionally less than 30 percent of the surface area, optionally less than 20 percent of the surface area, or optionally less than 10 percent of the surface area. The portion 28 may, in certain aspects, be greater than 10 percent of the surface area, optionally greater than 20 percent of the surface area, optionally greater than 30 percent of the surface area, optionally greater than 40 percent of the surface area, optionally greater than 50 percent of the surface area, optionally greater than 60 percent of the surface area, optionally greater than 70 percent of the surface area, optionally greater than 80 percent of the surface area, or optionally greater than 90 percent of the surface area. In various aspects, the portion 28 may be 100 percent of the surface area such that the layer 22 covers substantially the entire external surface 24.

The layer 22 may include a metal material, a ceramic material, or both a metal material and a ceramic material. Metal materials may include aluminum, chromium, manganese, iron, titanium, copper, magnesium, zinc, alloys thereof, or combinations thereof, by way of example. Alloys may include manganese-copper alloys, magnesium alloys, and aluminum-zinc alloys, by way of example. In certain aspects, the layer 22 includes iron. In an example, the layer 22 includes manganese in an amount ranging from about 10 percent by weight to about 25 percent by weight, chromium in an amount ranging from about 10 percent to about 25 percent by weight, titanium in an amount ranging from about 0.5 percent by weight to about 1 percent by weight, and a balance iron. In another example, the layer 22 may include alumina. In various aspects, a single coating composition may both reduce surface-radiated noise during operation of the motor vehicle and long term corrosion.

The layer 22 may define a thickness. The thickness may range from about 5 µm to about 1 mm, or optionally about 10 µm to about 500 µm. For example, the thickness may range from about 10 µm to about 25 µm, about 25 µm to about 50 µm, about 50 µm to about 100 µm, about 100 µm to about 250 µm, or about 205 µm to about 500 µm. In certain aspects, a coated region may include a plurality of layers (see, e.g., second coated region 240 of FIG. 8) and the foregoing thickness may be a total thickness of all stacked layers.

The layer 22 may be applied to the core 20 via thermal spray, such as cold spray, diffusion bonding, or a combination thereof. In certain aspects, the layer 22 is a cold-spray layer. Cold spray is a type of thermal spray in which metal particles are deposited to a substrate (i.e., the core 20) primarily by kinetic energy rather than heat. Deposition of the metal particles is performed in solid state. More particularly, the metal particles are deposited via propulsion by heated nitrogen or helium gas to supersonic speed. The solid spray deposition may advantageously prevent metallurgical transformations, phase change, and grain growth. The deposition process may be performed without creating heat affected zones on the core 20 and with very low oxide content. The resulting layer may have a low porosity (e.g., less than about 0.5 percent), a high hardness, high thermal and electrical conductivity, and high homogeneity.

In various aspects, and as will be described in greater detail below, an exhaust component according to the principles of the present disclosure may have one or more coatings depending on expected noise and corrosion of the component when it is used on a motor vehicle. For example, an exhaust component may include a layer on any surface, such as an external surface, an internal surface, or both an external surface and an internal surface. The layer may cover substantially an entire surface or be localized such that it covers less than 100 percent of the area of the surface. Furthermore, a coated region may include a plurality of layers, which may or may not be coextensive. An exhaust component may include a single coated portion or multiple coated portions.

Figure 2:
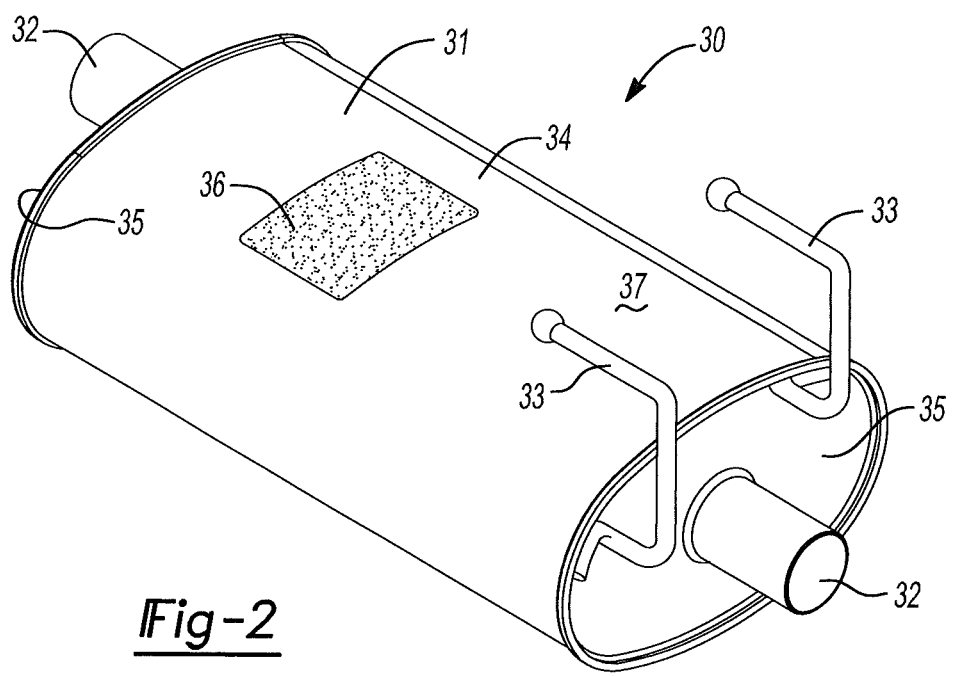
FIG. 2 is a perspective view of another exhaust component according to the principles of the present disclosure.

Referring to FIG. 2, an exhaust assembly 30 according to the principles of the present disclosure is provided. The exhaust assembly 30 generally includes an exhaust component 31, pipes 32 (e.g., inlet and outlet pipes), and one or more hangers 33. In certain aspects, the exhaust component 31 may be a rolled-shell muffler.

The exhaust component 31 may include a wall 34 and a pair of end caps 35 that cooperate to at least partially define an internal volume. The pipes 32 may be fluidly connected to the internal volume. A coating or layer 36 may be disposed on an outer surface 37 of the wall 34. The coating 37 may be similar to the coating 22 of FIG. 1.

With reference to FIGS. 3A-3D, another exhaust assembly 38 according to the principles of the present disclosure is provided. The exhaust assembly 38 includes an exhaust component 40. The exhaust component 40 includes a wall 42. The wall 42 at least partially defines an internal volume 44. The exhaust component 40 further includes an inlet 46 and an outlet 48 in fluid communication with the internal volume 44. The inlet 46 may be coupled to an inlet pipe 50 and the outlet 48 may be coupled to an outlet pipe 52, such as by first welds 54. The exhaust assembly 38 may further include a hanger 56 for coupling the exhaust component 40 to a vehicle. The hanger 56 may be coupled to the wall 42 by second welds 58.

The wall 42 may include a core 60 having a first or external surface 62 and a second or internal surface 64. The exhaust assembly 38 may further include a first coated region 66 and a second coated region 68. First and second coated regions 66, 68 may be discrete and each adapted to reduce surface-radiated noise and/or corrosion. Each of the first, second, and third coated regions 66, 68 may be individually adapted to reduce or prevent surface-radiated noise and/or corrosion, depending on expected behavior of the exhaust component 40 in the respective region 66, 68. In various aspects, uncoated regions 72 may extend between the coated regions 66, 68.

Figure 3A:
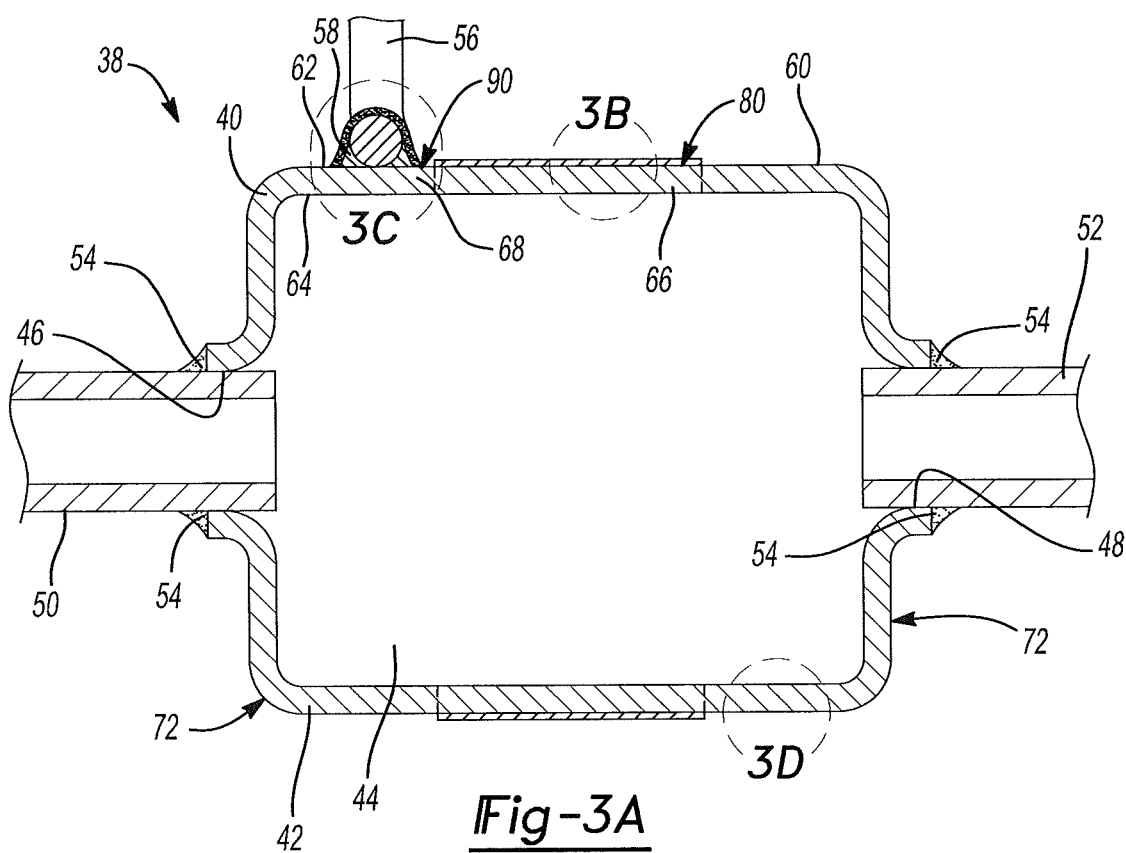
FIG. 3A is a partial sectional view of an exhaust assembly including an exhaust component according to the principles of the present disclosure.
Figure 3B:
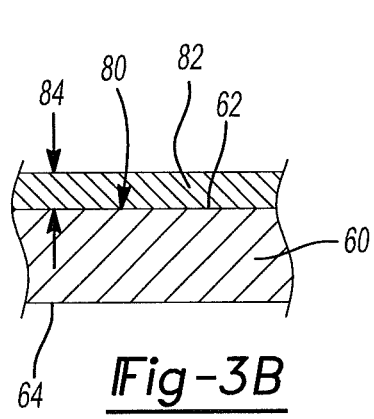
FIG. 3B is a partial sectional view of a portion of the exhaust component of FIG. 3A.
Figure 3C:
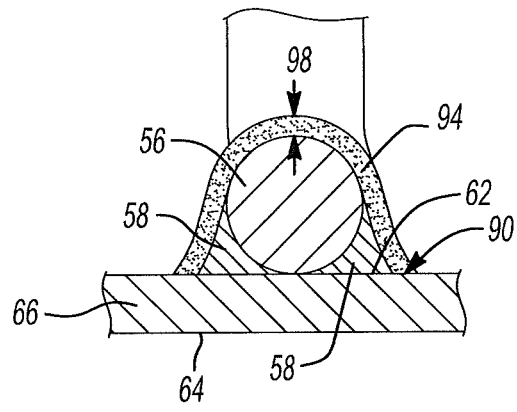
FIG. 3C is a partial sectional view of another portion of the exhaust component of FIG. 3A.
Figure 3D:
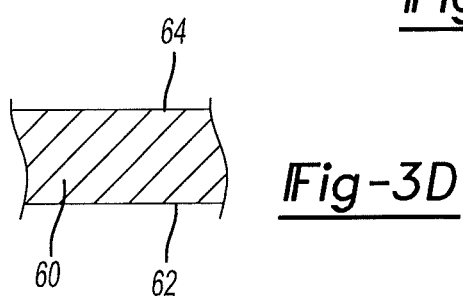
FIG. 3D is a partial sectional view of yet another portion of the exhaust component of FIG. 3A.

The first coated region 66 may be disposed on a first portion 80 of the external surface 62. As best shown in FIG. 3B, the first coated region 66 may include a first layer 82 having a first composition. In certain aspects, the first layer 82 may be disposed in direct contact with the external surface 62. The first layer 82 may define a first thickness 84 substantially perpendicular to the external surface 62. In some examples, the first portion 80 of the external surface 62 is expected to experience relatively high vibration and resulting noise during operation of a motor vehicle including the exhaust component 40. The first coated region 66 may be adapted to reduce or prevent such surface-radiated noise.

The second coated region 68 is disposed on a second portion 90 of the external surface 62 and may extend over the second welds 58 and hanger 56. The second portion 90 may be susceptible to corrosion. The second coated region 68 may reduce or prevent corrosion. The second coated region 68 includes a second layer 94 having a second composition. The second composition may be the same as or different than the first composition. The second layer 94 may define a second thickness 98, which may be the same as or different from the first thickness 84.

As will be described in greater detail below in conjunction with FIG. 13, layers may be applied to an exhaust component after the exhaust component is formed and/or or to a metal sheet (i.e., a metal sheet including a material of a core) prior to the metal sheet being formed into the exhaust component. FIGS. 4A-12 depict metal sheets having various coating configurations according to the principles of the present disclosure. It should be appreciated that similar or identical coating configurations may present on or applied to a formed exhaust component.

Referring to FIGS. 4A-4B, a metal sheet 110 according to the principles of the present disclosure is provided. An exhaust component having reduced susceptibility to surface-radiated noise and/or corrosion may be formed from the metal sheet 110 (see, e.g., exhaust components 10 and 40 of FIGS. 1 and 2, respectively). The metal sheet 110 includes a core 112, which may be similar to the core 20 of FIG. 1. The core 112 includes a first surface 114 and a second surface 116 opposite the first surface 114.

The metal sheet 110 further includes a layer 118 disposed on the first surface 114. Unless otherwise described, the layer 118 may be similar to the layer 22 of FIG. 1. The layer 118 is disposed on a portion 120 (FIG. 4B) of the first surface 114 that is less than 100 percent of the area of the first surface 114. In certain aspects, the layer 118 is disposed directly adjacent to and aligned with an edge 122 of the core 112.

With reference to FIG. 5, another metal sheet 130 according to various aspects of the present disclosure is provided. An exhaust component having reduced susceptibility to surface-radiated noise and/or corrosion may be formed from the metal sheet 130. The metal sheet 130 includes a core 132 similar to the core 20 of FIG. 1. The core 132 includes a first surface 134 and a second surface 136 opposite the first surface 134.

The metal sheet 130 further includes a first layer 138 and a second layer 140. Unless otherwise described, the first and second layers 138, 140 may be similar to the layer 22 of FIG. 1. It should be appreciated that the first and second layers 138, 140 may have the same compositions or different compositions. Furthermore the first and second layers 138, 140 may have the same thicknesses or different thicknesses.

The first layer 138 is disposed on a portion 142 of the first surface 134 of the core 132. The second layer 140 is disposed on a portion 144 of the second surface 136 of the core 132. In certain aspects, the first and second portions 142, 144 may be substantially aligned and coextensive across a thickness of the core 132. Both of the first and second layers 138, 140 may be directly adjacent to and aligned with an edge 146 of the core 132.

Referring to FIG. 6, another metal sheet 160 according to various aspects of the present disclosure is provided. An exhaust component having reduced susceptibility to surface-radiated noise and/or corrosion may be formed from the metal sheet 160. The metal sheet 160 includes a core 162 similar to the core 20 of FIG. 1. The core 162 includes a first surface 164 and a second surface 166 opposite the first surface 164.

The metal sheet 160 further includes a first layer 168 and a second layer 170. It should be appreciated that the first and second layers 168, 170 may have the same or different compositions and the same or different thicknesses. In certain aspects, the first and second portions 172, 174 may have different sizes (i.e., surface areas). In the example shown, the second portion 174 is larger than the first portion 172. It should be appreciated that in other embodiments, a first portion may be larger than a second portion.

The first layer 168 is disposed on a portion 172 of the first surface 164. The second layer 170 is disposed on a portion 174 of the second surface 166. The first layer 168 may be directly adjacent to and aligned with a first edge 176 of the core 162 and spaced apart from a second edge 178 of the core 162. The second layer 170 may be spaced apart from both of the first and second edges 176, 178 of the core 162.

Figure 7A:
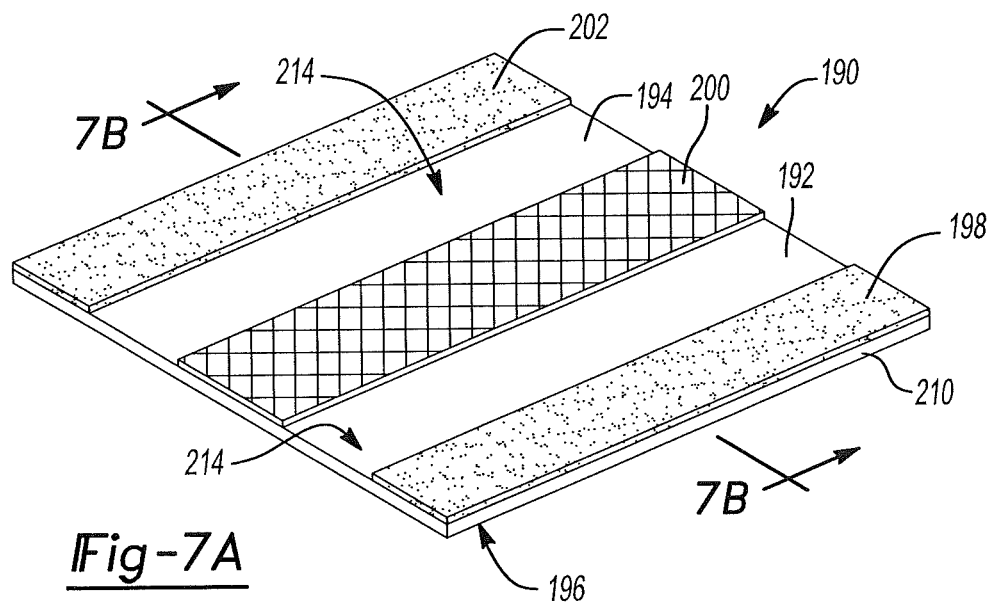
FIG. 7A is a top perspective view of a metal sheet including a core and a plurality of layers disposed on a surface of the core according to the principles of the present disclosure.
Figure 7B:
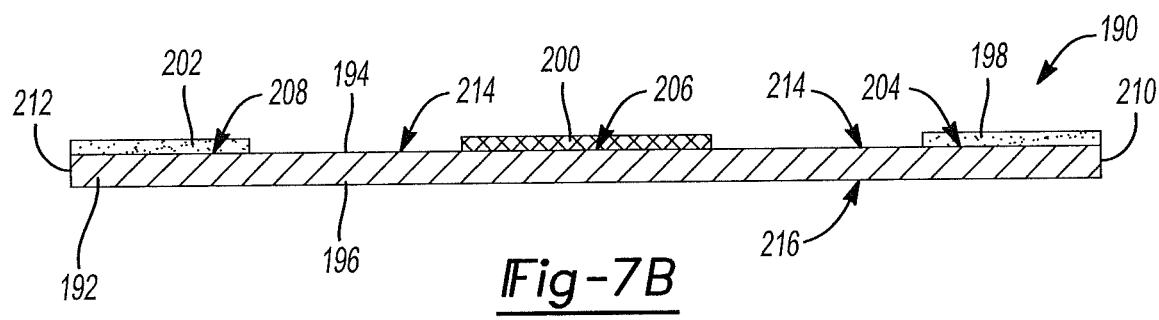
FIG. 7B is a sectional view of the metal sheet of FIG. 6A taken at line 6B-6B of FIG. 6A.

With reference to FIGS. 7A-7B, yet another metal sheet 190 according to the principles of the present disclosure is provided. An exhaust component having reduced susceptibility to surface-radiated noise and/or corrosion may be formed from the metal sheet 190. The metal sheet 190 includes a core 192 similar to the core 20 of FIG. 1. The core 192 includes a first surface 194 and a second surface 196 opposite the first surface 194.

The metal sheet 190 further includes a first layer 198, a second layer 200, and a third layer 202. The first, second, and third layers 198, 200, 202 are disposed on respective first, second, and third portions 204, 206, 208 of the first surface 194. The first layer 198 may have a first composition, the second layer 200 may have a second composition, and the third layer 202 may have a third composition. In certain aspects, the first and third compositions may be the same and the second composition may be different from the first and third compositions.

The first layer 198 may be disposed along and directly adjacent to a first edge 210 of the core 192. The third layer 202 may be disposed along and directly adjacent to a second edge 212 of the core 192. The second layer 200 may be disposed between the first and third layers 198, 202 and spaced apart from the first and second edges 210, 212. The second layer 200 may be spaced apart from the first and third layers 198, 202 such that uncoated regions 214 extend between the first and second layers 198, 200 and the second and third layers 200, 202. The second surface 196 may also include an uncoated region 216 covering substantially the entire second surface 196.

Figure 8:
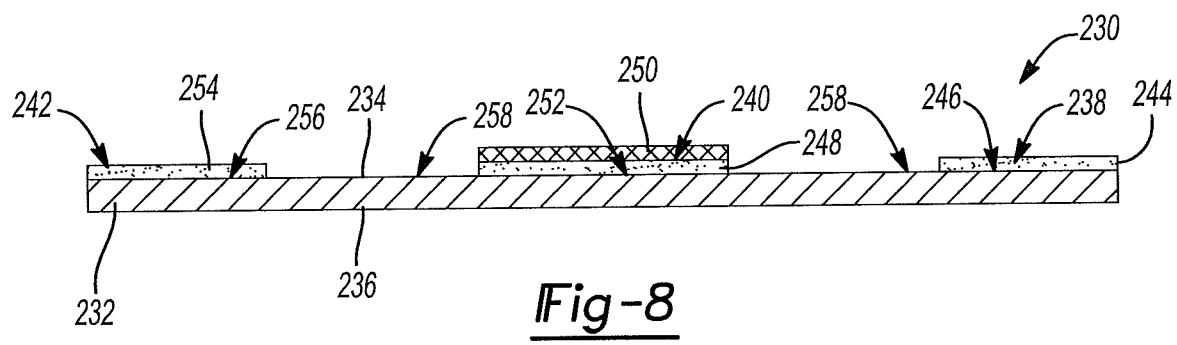
FIG. 8 is a sectional view of another metal sheet according to the principles of the present disclosure, the metal sheet including a core and a plurality of coated regions, with one coated region including multiple layers.

Referring to FIG. 8, yet another metal sheet 230 according to the principles of the present disclosure is provided. An exhaust component having reduced susceptibility to surface-radiated noise and/or corrosion may be formed from the metal sheet 230. The metal sheet 230 includes a core 232 similar to the core 20 of FIG. 1. The core 232 includes a first surface 234 and a second surface 236 opposite the first surface 234.

The metal sheet 230 includes a first coated region 238, a second coated region 240, and a third coated region 242. The first coated region 238 includes a first layer 244 disposed on a first portion 246 of the first surface 234. The second coated region 240 includes a second layer 248 and a third layer 250. The second layer 248 is disposed on a second portion 252 of the first surface 234. The third layer 250 is disposed on and coextensive with the second layer 248. The third coated region 242 includes a fourth layer 254 disposed on a third portion 256 of the first surface 234. Uncoated regions 258 may extend between the first and second coated regions 238, 240 and the second and third coated regions 240, 242.

Unless otherwise described, the first, second, third, and fourth layers 244, 246, 250, 254 may be similar to the layer 22 of FIG. 1. The first, second, third, and fourth layers 244, 248, 250, 254 may have first, second, third, and fourth compositions, respectively. In certain aspects, the first, second, and fourth compositions may be the same and the third composition may be different.

With reference to FIGS. 9A-9B, yet another metal sheet 270 according to the principles of the present disclosure is provided. An exhaust component having reduced susceptibility to surface-radiated noise and/or corrosion may be formed from the metal sheet 270. The metal sheet 270 includes a core 272 similar to the core 20 of FIG. 1. The core 272 includes a first surface 274 and a second surface 276 opposite the first surface 274.

The metal sheet 270 may further include a first layer 278 and a second layer 280. Unless otherwise described, the first and second layers 278, 280 may be similar to the layer 22 of FIG. 1. The first layer 278 may be disposed directly on the first surface 274 and cover substantially the entire first surface 274. The second layer 280 may be disposed directly on the first layer 278. The second layer 280 may cover a portion of a surface area of the first layer 278 that is less than 100 percent of the surface area. The second surface 276 may be uncoated.

The first and second layers 278, 280 have first and second compositions, respectively. In the embodiment shown, the first and second compositions are different. However, it should be appreciated that the first and second compositions may alternatively be the same.

Referring to FIG. 10, yet another metal sheet 290 according to the principles of the present disclosure is provided. An exhaust component having reduced susceptibility to surface-radiated noise and/or corrosion may be formed from the metal sheet 290. The metal sheet 290 includes a core 292 similar to the core 20 of FIG. 1. The core 292 includes a first surface 294 and a second surface 296 opposite the first surface 294.

The metal sheet 290 further includes a first layer 298, a second layer 300, and a third layer 302. The first layer 298 is disposed on a first portion 304 of the first surface 294. The second layer 300 is disposed on a second portion 306 of the first surface 294. The third layer 302 is disposed on a third portion 308 of the first surface 294. The first, second, and third layers 298, 300, 302 cooperate to cover substantially the entire first surface 294. The second surface 296 is uncoated.

The first, second, and third layers 298, 300, 302 have first, second, and third compositions, respectively. In the embodiment shown, the first and third compositions are the same and the second composition is different. It should be appreciated that other combinations of compositions, including embodiments, with three different compositions, are contemplated.

With reference to FIG. 11, yet another metal sheet 320 according to the principles of the present disclosure is provided. An exhaust component having reduced susceptibility to surface-radiated noise and/or corrosion may be formed from the metal sheet 320. The metal sheet 320 includes a core 322 similar to the core 20 of FIG. 1. The core 322 includes a first surface 324 and a second surface 326 opposite the first surface 324.

The metal sheet 320 may further include a first layer 328, a second layer 330, and a third layer 332. Unless otherwise described, the first, second, and third layers 328, 330, 332 may be similar to the layer 22 of FIG. 1. The first, second, and third layers 328, 330, 332 may be disposed on first, second, and third portions 334, 336, 338 of the first surface 324, respectively.

The first and second portions 334, 336 may be partially overlapping. The second and third portions 336, 338 may be partially overlapping. In the example shown, the first and third layers 328, 332 are disposed directly on the first and third portions 334, 338 of the first surface 324. A center region 340 of the second layer 330 is disposed directly on the first surface 324, while outer regions 342 of the second layer 330 overlap and are disposed directly on the first and third layers 328, 332.

The first, second, and third layers 328, 330, 332 have first, second, and third compositions, respectively. In the embodiment shown, the first and third compositions are the same and the second composition is different. It should be appreciated that other combinations of compositions, including embodiments, with three different compositions, are contemplated.

Referring to FIG. 12, yet another metal sheet 350 according to the principles of the present disclosure is provided. An exhaust component having reduced susceptibility to surface-radiated noise and/or corrosion may be formed from the metal sheet 350. The metal sheet 350 includes a core 352 similar to the core 20 of FIG. 1. The core 352 includes a first surface 354 and a second surface 356 opposite the first surface 354.

The metal sheet 350 further includes a first layer 358, a second layer 360, and a third layer 362. The first layer 358 may be disposed directly on the first surface 354. The first layer may be coextensive with the first surface 354 such that it covers substantially the entire first surface 354. The second layer 360 may be disposed directly on a portion of the first layer 358. The third layer 362 may be disposed directly on a portion of the second layer 360.

The first, second, and third layers 358, 360, 362 have first, second, and third compositions, respectively. In the embodiment shown, the first, second, and third compositions are all different. It should be appreciated that other combinations of compositions are contemplated.

The present disclosure also provides, in various aspects, methods of improving sound dampening and/or corrosion resistance of an exhaust component for a motor vehicle. The method generally includes identifying a target region that is likely to experience surface-radiated noise and/or corrosion, and applying a coating to the target region.

Figure 13:
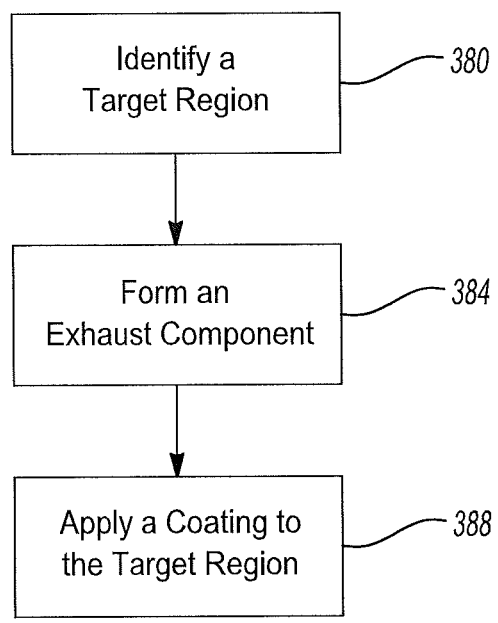
FIG. 13 is a flowchart depicting a method of improving sound damping of an exhaust component according to the principles of the present disclosure.

Referring to FIG. 13, an example method improving sound dampening of an exhaust component for a motor vehicle according to the principles of the present disclosure is provided. Improving sound dampening may include reducing or preventing surface-radiated noise from the exhaust component during operation of the motor vehicle. At 380, the method includes identifying a target region. The target region may be particularly susceptible to surface-radiated noise and/or corrosion. In certain aspects, the target region may be expected to exceed a threshold level of surface-radiated noise during operation of the motor vehicle. Additionally or alternatively the target region may be expected to exceed a threshold level of corrosion over a predetermined time period.

The target region may be identified on a substantially identical exhaust component, a similar exhaust component, or the exhaust component itself. In one example, the target region is identified based on a physical bench test of a substantially identical component, a similar component, or the component itself. In another example, the target region is predicted through simulations.

At 384, the method may further include forming an exhaust component. Forming the exhaust component may be performed after identifying the target region at 380 when the target region is identified on a substantially identical exhaust component or a similar exhaust component. Forming the exhaust component may be performed before identifying the target region at 380 when the target region is identified on the exhaust component itself. The exhaust component may be formed from a metal sheet.

At 388, the method includes applying a coating to the target region. The coating may be applied via cold spray, thermal spray, diffusion bonding, or any combination thereof. In certain aspects, the coating is applied via cold spray. Applying the coating may optionally include roughening a surface of the target region to improve adherence of the coating to the target region prior to the cold-spraying, thermal spraying, or diffusion bonding. Roughening the surface may include grit blasting the target region, by way of example.

In some examples, applying the coating at 388 is performed after forming the exhaust component at 384. Accordingly, prior to applying the coating, the exhaust component may be formed from a material of the core. In other examples, applying the coating at 388 is performed prior to forming the exhaust component at 384. More particularly, the coating is applied to a metal sheet (see, e.g., metal sheets 110, 130, 160, 190, 230, 270, 290, 320 of FIGS. 4A, 5, 6, 7A, 8, 9A, 10, 11, 12, respectively) at 388, and then the metal sheet is formed into the exhaust component at 384. In still other embodiments, some layers of the coating are applied prior to forming the exhaust component and other layers of the coating are applied after forming the exhaust component.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust component for a motor vehicle, comprising:
a wall including a core layer having a surface and a first layer disposed on a portion of the surface, the portion being less than 100 percent of an area of the surface, the core layer having a first composition and the first layer being a cold-sprayed layer and having a second composition different from the first composition, the first layer reducing surface-radiated noise from the exhaust component during operation of the motor vehicle;
an internal volume at least partially defined by the wall;
an inlet in fluid communication with the internal volume; and
an outlet in fluid communication with the internal volume.

2. The exhaust component of claim 1, wherein the first layer defines a thickness ranging from 5 μm to 1 mm.

3. The exhaust component of claim 1, wherein the wall further includes a second layer disposed on the surface.

4. The exhaust component of claim 3, wherein the second layer has a third composition different from the second composition and the first composition.

5. The exhaust component of claim 3, wherein the first layer and the second layer are at least partially overlapping.

6. The exhaust component of claim 5, wherein the first layer and the second layer are coextensive.

7. The exhaust component of claim 3, wherein the first layer and the second layer are non-overlapping.

8. The exhaust component of claim 1, wherein the first layer comprises iron.

9. The exhaust component of claim 8, wherein the first layer consists essentially of manganese in an amount ranging from 10 percent to 25 percent, chromium in an amount ranging from 10 percent to 25 percent, titanium in an amount ranging from 0.5 percent to 1 percent, and a balance iron.

10. The exhaust component of claim 1, wherein the core layer comprises stainless steel.

11. The exhaust component of claim 1, wherein the exhaust component comprises one of: a muffler, an exhaust pipe, a catalytic converter, a urea injector, a selective catalytic reduction unit, a diesel oxidation catalyst, or a diesel particulate filter.

12. The exhaust component of claim 11, wherein the exhaust component comprises the muffler.

13. An exhaust component for a motor vehicle, comprising:
   a wall including a core layer having a surface and a corrosion-resistant layer disposed on a portion of an area of the surface, the portion being less than 100 percent of the surface, the core layer comprising stainless steel and the corrosion-resistant layer comprising aluminum, chromium, manganese, iron, or combinations thereof, the corrosion-resistant layer reducing surface radiated noise from the exhaust component during operation of the motor vehicle;
   an internal volume at least partially defined by the wall;
   an inlet in fluid communication with the internal volume; and
   an outlet in fluid communication with the internal volume.

* * * * *